Feb. 25, 1947. C. FARROW 2,416,517
METHOD AND APPARATUS FOR DETERMINING PHASE SHIFT
Filed April 8, 1943
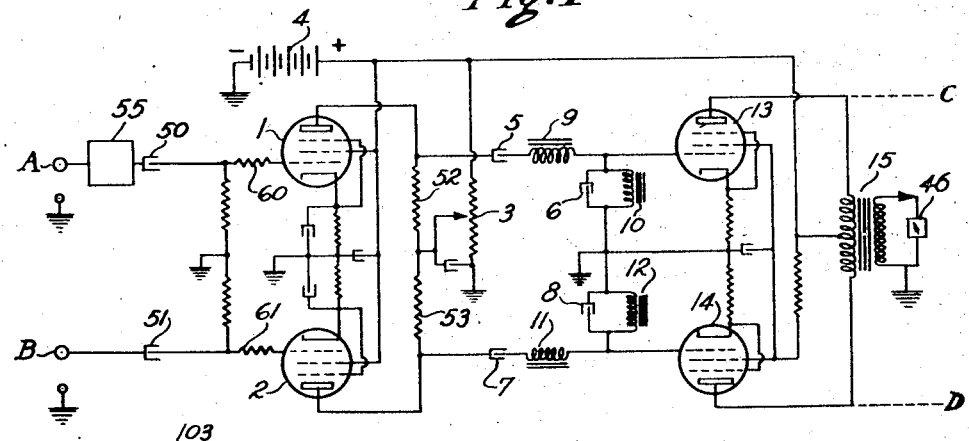
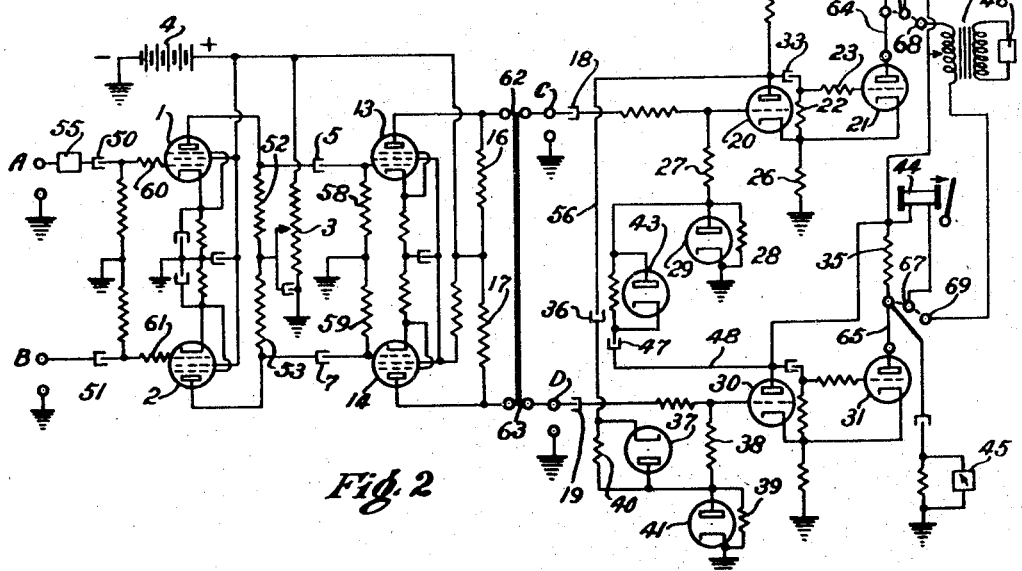
INVENTOR.
CECIL FARROW
BY
Richey & Watts
ATTORNEYS Patented Feb. 25, 1947

2,416,517

UNITED STATES PATENT OFFICE 2,416,517

METHOD AND APPARATUS FOR
DETERMINING PHASE SHIFT

Cecil Farrow, Bainbridge Township, Geauga County, Ohio, assignor to Republic Steel Corporation, Cleveland, Ohio, a corporation of New Jersey Application April 8, 1943, Serial No. 482,288

13 Claims. (Cl. 172—245)

This invention relates to testing circuits and more particularly to a method of and electrical circuits for indicating a phase shift between currents having an alternating wave form or for comparing two input voltages for phase difference.

In the process of non-destructive testing of metal tubing, rods, or other elongated objects for defects, it has become the practice to use the objects being tested to influence an inductive circuit where an alternating signal is being transferred, to cause the phase relations of the induced waves to be controlled by the article under test in such a manner that changes in the phase relations of the signal caused by the presence of defects in the article are an indication of the presence of such defects. In this respect it is desirable to compare the alternating wave effected by the article under test with a standard wave so that changes in the phase relations between the two waves will be an indication and can be utilized to indicate the presence or absence of defects in the article. One such method and apparatus for generating the alternating currents and utilizing them in a testing apparatus is shown in the United States Letters Patent to Horace C. Knerr and Cecil Farrow, No. Re. 21,003 of February 14, 1939.

By my present invention I can detect, not only that there is a difference between the phase angles of two alternating waves, but also the number of degrees shift as well as the direction of the shift. Furthermore, the circuit also prevents changes in magnitude of the induced voltages, which is usually due to difference in permeability throughout the article under test, from furnishing false indications, since such differences are not necessarily due to undesirable defects.

Although the circuit of my invention and apparatus embodying the precepts thereof are particularly adaptable to the testing of metal articles for defects, it should be understood that the invention is applicable in many other places; and that although broadly it is concerned with the comparison of the phase relation between two alternating current wave forms, it is also adaptable to other uses.

It is therefore an object of my invention to porvide an improved circuit for indicating a difference in phase relation between two alternating voltage waves.

Another object of my invention is to provide a circuit which will eliminate magnitude variations between alternating waves and be only sensitive to phase differences between the waves.

Another object of my invention is to provide a circuit and apparatus for detecting which of two waves has shifted in phase.

Another object of my invention is to provide an apparatus for indicating the degree of phase shift of an alternating wave as well as the direction of such shift.

Another object of my invention is to provide a circuit which is triggered by the incoming wave fronts to provide an amplified wave controlled by the wave under examination.

Another object of my invention is to provide a circuit where a standard wave is mixed with a testing wave to indicate differences in phase between the two waves.

Another object of my invention is to apply two waves to be compared to a pair of trigger-controlled pulse circuits and to cause one of said circuits to operate on the other to cause the circuit receiving the leading wave to block the other circuit until after the leading wave has passed.

Another object of my invention is to utilize an impulse of extremely short duration to trigger a circuit which will provide an impulse of longer duration capable of operating an indicating device.

Another object of my invention is to convert an impulse having a slanting wave front to one having a steep wave front wave and utilizing the steep wave front wave to trigger a circuit to provide a pulse of predetermined duration.

Still other objects of my invention and the invention itself will become more apparent from the following description of an embodiment thereof, which description is illustrated by the accompanying drawings and wherein;

Fig. 1 is a schematic view of a circuit for receiving two alternating waves and indicating in the output a phase difference, and Fig. 2 is a schematic view of a circuit for an apparatus for determining which input is ahead in phase; and Fig. 3 is a schematic view of a circuit which may precede the circuit of Fig. 1 for supplying the alternating currents to be compared.

Referring to the drawings:

As best shown in Fig. 3 there is provided an alternating current source 101 which is connected to a primary coil 102. A pair of pickup coils 103 are placed in inductive relation to the primary. The voltage induced in the secondary circuit is controlled or affected by passing the article to be tested through the coils in a manner such as is described in the aforementioned reissue patent, the circuit 103 corresponding to the pickup circuit shown ahead of the circuit A in Fig. 5 of said patent. The pickup circuit is followed by an amplifier 104 in which the signals may be amplified, the gain of the amplifier being variable. At 106 there is shown a series primary inductively coupled to a secondary 107. This provides a means for furnishing a standard signal with which the signal, the phase of which may be shifted by the article under test, may be compared. The coil 107 is connected to a variable gain amplifier 108 and its output is fed through a phase shifting circuit indicated at 109. There is thus provided two signals one of which may be used as a standard for comparative purposes and the other of which may encounter phase shift due to defects in the article under test. The output terminals A' and B' may be connected to the input devices A and B of Fig. 1.

The signal, the phase of which is to be observed, and another signal with which the signal is to be compared for determination of the phase shift, are fed into the circuit of Fig. 1 at A and B. The source or sources of the signal fed to A and B may be derived from a common frequency source or be two sources of the same frequency (or multiple thereof) and synchronized. One signal is fed directly to either A or B and the other after being affected by the article under test is fed to the other terminal. If desired the signals may be amplified by an amplifier, not shown, prior to feeding into A and B; in the case of Fig. 3 such an amplifier is shown. Amplification is preferable in order to assure that the signals will always be above a minimum voltage which is desirable in the subsequent removal of amplitude variations. The signals are then fed through resistors 60 and 61, and blocking condensers 50 and 51, to the grids of the tubes 1 and 2 which tubes are arranged in the circuit to clip the signals. This is accomplished by operating the tubes with a low plate voltage, the plate supply being indicated at 4 and which is coupled to the plates of the tubes 1 and 2 through the potentiometer 3. The output voltages across the load resistors 52 and 53 are then of a substantially square wave form and of equal amplitude. Minor variations in amplitude of the waves at A and B have no effect on the output because of the clipping of the signals in the tubes 1 and 2.

The signals appearing across the load resistors are fed through filter networks for removing harmonics comprising the series condensers 5 and 7, and the chokes 9 and 11 followed by the parallel condensers and chokes 6 and 10, and 8 and 12, respectively, to the grids of the amplifier tubes 13 and 14.

In this part of the circuit the signals of equal amplitude are amplified. The plate circuits of these tubes are connected together through the center tapped primary of the transformer 15 and the amplified output from the two tubes, assuming the voltage waves to be in phase, oppose each other and cancel out in this primary. Therefore, so long as the signals are in-phase there is no transfer of energy to the secondary of the transformer 15 even though the input voltage at A and B might vary in magnitude. This condition will hold as long as the input voltages at A and B are of sufficient magnitude to cause the clipping action to take place.

If, however, any phase shift between the two amplified signals should occur, then the signal output from tubes 13 and 14 would be out of phase and there will be an unbalance in the transformer 15 which will cause an output voltage to appear across the secondary that can be measured by a suitable means.

At 55 I have indicated diagrammatically by a block any conventional form of phase shifter, which can be inserted in the circuit at this point. This device may be calibrated and can be used in either one of the input leads at A or B to measure the actual phase difference by determining how much shifting of phase is necessary to reduce the output at 15 to zero.

This makes it possible to determine the amount and the direction of the phase shift and also allows one output to be shifted relative to the other for a purpose which will hereinafter more clearly appear. It should be noted, however, when the circuit of Fig. 1 is used in conjunction with that of Fig. 3, that the phase shifter 55 may be omitted when the one at 109 is used.

Another form of determining simply which input is ahead in phase is illustrated in Fig. 2 to the right of the switches 62 and 63. This circuit is adapted to be used in conjunction with that of Fig. 1, with some slight modification in Fig. 1. In this case the switches 62 and 63 are closed. The portion of the circuit of Fig. 2 to the left of the switches 62 and 63 corresponds to the circuit of Fig. 1 modified by removing the transformer 15 and inserting in its place resistors 16 and 17. Also the filtering in the circuit is removed by taking out the chokes 9, 10, 11 and 12 and the condensers 6 and 8 and inserting grid return resistors 58 and 59 to keep the grids from blocking. The condensers 5 and 7 are left in the circuit to keep the plate voltage from tubes 1 and 2 off of the grids of tubes 13 and 14. This will result in a substantially square wave output at C and D across the load resistors 16 and 17.

The output then is applied as indicated at C and D to the circuit of Fig. 2, series blocking condensers 18 and 19 being provided in the circuit to keep the plate and D. C. voltages away from the succeeding circuit. At this point it should be understood that the circuit of Fig. 1 as revised is to provide a signal having a steep wave front; that is, the signal at the input having a slanting wave front will be converted to one having a steep wave front.

Generally the indicating circuit comprises two like circuits which are pulse generating circuits triggered by the incoming waves. Each of the circuits contains a pair of vacuum tubes which may be triodes, one of which, under normal conditions, is biased to cut off by the flow of plate current through the other. Obviously these would not necessarily have to be triodes or two separate tubes but could be in a single envelop such as a 6N7 which is a dual triode. The pulse of positive current reverses this normal condition and the tube previously biased to cut off goes to maximum current while the other tube becomes biased to cut off. This condition lasts for a short period, the length of which depends upon the circuit constants. Of particular interest is the fact that each of these circuits, which are identical, is so coupled electrically to the other circuit that if one circuit receives a pulse first it automatically biases the other circuit against any action until the pulse first received has a chance to act. Thus, the circuit may differentiate between very small angles of phase shift and therefore enable a determination of which incoming wave was leading.

In Fig. 2, the tubes 20 and 21 comprise the tube normally biased to cut off and the tube normally drawing current, respectively.

The condition of the circuit will first be considered when no voltage wave is applied to either input C or D. An anode voltage supply, indicated by the battery 24, is provided, being connected to the anodes of the tubes 20 and 21 through resistors 32 and 25 respectively. The grid of tube 21 is returned to the cathode of this tube through the series resistors 23 and 22. The cathodes of both tubes 20 and 21 are connected to the ground which is also the negative of the battery through a resistor 26. The value of the resistors 25 and 26 in the plate and cathode circuits as well as the battery voltage will determine the normal (no signal) plate current through this tube, which may be from 6 to 10 milliamperes. The resistor 26 will also be of such a value that with this much plate current there will be from 10 to 20 volts drop across it.

The grid of the tube 20 is connected to ground through the resistors 27 and 28, the resistor 28 being disposed across a diode tube 29. Since there is no input voltage at C and therefore no voltage drop across resistor 27 and tube 29, the grid of tube 20 will be at ground potential. Then because the cathode of tube 20 is connected to ground through the resistor 26 across which a voltage is developed due to the plate current flowing in tube 21, tube 20 will have a sufficient bias on the cathode to bias tube 20 to cut off and no plate current will be flowing in tube 20. It should be noted at this time that the tubes 30 and 31 corresponding to the tubes 20 and 21 are connected in exactly the same manner and therefore the same condition applies in that part of the circuit.

Assuming next that the positive portion of a voltage wave arrives at C and is of sufficient magnitude when impressed on the grid of tube 20 to cause a small amount of current flow in the plate circuit. The plate voltage of this tube will drop upon the flow of plate current. This drop in plate voltage will cause a negative pulse to pass through a coupling condenser 33 and the resistor 23 onto the grid of tube 21. The negative potential on the grid of tube 21 will cause a drop in its plate current. Since this plate current is through the resistor 26 the voltage drop across this resistor is decreased and hence the cathode bias on tube 20 is decreased causing still more current to flow in the tube 20 and a still further drop on the grid of tube 21. This condition is therefore augmented and the action cumulative so that in a very short time, possibly one micro-second after the triggering of tube 20, conditions in the circuit reverse and tube 21 ceases to draw current and tube 20 passes full current which may be 4 or 5 milli-amperes. The triggering of the circuit is not dependent upon the duration of the positive pulse since once the action is started it continues by itself completing the cycle.

After the passing of the positive pulse on tube 20, a current flows through resistor 22 and the grid of tube 21 is then returned to its normal potential. At that time current flow starts in tube 21 again producing a bias for tube 20 through the resistor 26 and tube 20 is cut off and the circuit is in the same condition as prior to receiving the pulse, ready for the next triggering pulse.

A relay coil 42 or a relay coil 44 may be substituted for either of the plate resistors 25 or 35 by shifting switch blades 64 and 65 to stationary contacts 66 and 67, respectively, and its action used to operate a suitable visible or audible signal.

If a positive pulse comes in at D instead of C obviously that part of the circuit connected to D will operate, and in exactly the same manner.

Another feature of my invention constitutes so interconnecting the two circuits that after either circuit starts to pass plate current the other will be prevented from responding while this pulse is present. This enables the circuit to indicate very small displacements and is effected as follows:

When the plate voltage of the tube 20 decreases due to the reception of a positive pulse on its grid, a portion of the same negative pulse applied to the grid of tube 21 is also applied to the grid of tube 30. This is accomplished by way of the line 56 and coupling condenser 36 through the diode 37 and resistor 38. Inasmuch as the tube 30 is already biased to cut off this pulse has no effect except to oppose and counteract any positive pulse applied to the input D.

The resistor 39 which provides a grid return for the tube 30 should be of high enough value to prevent the negative pulse from leaking off the grid until tubes 20—21 have completed their action. The positive pulse due to the return of current flow in tube 21 will also pass through the condenser 36 but is blocked by the diode 37. The diode 37 is shunted by the resistor 40 of fairly high value to prevent a D. C. voltage from building up and blocking condenser 36. The positive pulse is by-passed by the diode 41 to ground. The resistor 39 in parallel with diode 41 also prevents the grid of tube 30 from being blocked by a D. C. voltage building up on condenser 19.

The diodes 29 and 43 fulfill the same function as the diodes 37 and 41 when a leading pulse is received at D. In this case when the plate voltage of tube 30 decreases, the negatvie pulse is applied to the grid of tube 20 by way of the line 48, coupling condenser 47, through the diode 43 and resistor 27. Because 20 is already biased to cut off it has no effect. The positive pulse in this case is blocked by the diode 43 and is passed to ground by diode 29.

It will therefore be seen that if a series of waves, which as previously stated are square waves due to the changes mentioned in connection with the circuit of Fig. 1, are reaching both C and D, if one of these waves reaches C or D ahead of the other then that part of the circuit receiving the first pulse will operate and prevent the other section from operating. That is, if the pulse is received at C, tubes 20—21 act to prevent tubes 30—31 from responding to an impulse on D, and if the pulse is received first at D, tubes 30—31 prevent the tubes 20—21 from responding.

By the proper choice of circuit components, particularly condenser 33 and resistors 22 and 26 and the corresponding parts of the circuit involving tubes 30 and 31 this blocking action can be made to last for approximately one-half to three-fourths of the cycle, after which the circuit will be ready upon the arrival of the next pulses to respond to the one arriving first.

As previously stated a relay or relays may be substituted for plate resistors 25 and 35 as shown in Fig. 2, or the output from the tube 31 may be provided with an output connector 34 enabling the circuit where input is at D to be coupled with some device such as a meter 45, light or relay to indicate when the input at D is leading that at C.

It should here be pointed out that the signals to the circuit of Fig. 2 do not necessarily have the same amplitude, although one having a steep wave front is advisable if small phase differences are to be detected.

Under one set of conditions it would be desirable to adjust the phase shifter connected in the circuit A, and wherein the output is at C, in such a manner that the signal from C is slightly ahead in phase of that at D.

Then if C is adjusted to be slightly leading in phase and if D represents the output from that portion of the circuit in which the phase is lagging and something happens in that circuit to cause the phase to advance, then the circuit coupled to C would be biased by the circuit coupled to D and a signal output would be indicated in the D circuit.

If the defects should be such as to cause a lagging wave then the circuit would be so connected that a lagging wave would effect C rather than D and C which was normally ahead would fall behind and again a defect would be indicated in the circuit connected to D.

Another modification of the invention which is contemplated is to omit the coupling between the two branches of the circuit of Fig. 2. This can be effected by removing the line 56, coupling condenser 36, resistor 40 and the diodes 37, 41 and 29 and their cooperating components. When this is done each branch of the circuit will respond to impulses reaching the terminals C and D, to provide a pulse from each of the output tubes 21 and 31. Assuming similarity of the tubes and circuit components, the output impulses would be of equal magnitude and if the impulses arriving at C and D are simultaneous the output pulses will also be simultaneous. These two pulses may be used to obtain a null indication when the inputs C and D are simultaneous. If, however, the input pulses at C and D are not in phase there would be a definite output voltage which would be proportional to the difference in time. Their output can then be used in a manner similar to that of Fig. 1 to operate an indicator for determining a phase difference. Such operation is accomplished by moving the switch blades 64 and 65 to stationary contacts 68 and 69, respectively.

It will thus be seen that I have provided an apparatus whereby an indication of phase shift may be obtained showing not only the amount but the direction of the shift. And further that I have provided a simplified form of indicating means which enables an operator to simply and positively be apprised that an impulse received in one circuit is ahead of that in another circuit. Further, that slight changes in phase shift which might under normal conditions be insufficient or too quick to operate a signal indicator such as a relay are converted to a type of signal which will operate the indicator.

Having thus described my invention I am aware that numerous and extensive departures may be made therefrom without departing from the spirit or scope of my invention.

I claim:

1. An indicator circuit for indicating a phase displacement of signals of the same frequency including a pair of trigger circuits each comprising a first triode vacuum tube section and a second triode vacuum tube section, and an indicator in the output of one of said circuits, said second triode passing normal current during conditions of no signal and generating a negative bias for said first triode to normally bias said first triode to non-conducting condition, said first triode being responsive to a signal to cause said circuit to have an increase in current in the first triode to maximum due to the said signal and said second triode being biased to non-conducting condition by said signal in the first triode and said triodes being returned to normal condition after a period determined by the circuit constants, the one of said trigger circuits receiving the signal leading in phase having means for supplying the other circuit with a bias and being adapted to provide a large bias of sufficient duration to block said other circuit from responding to a signal until the first circuit returns to normal.

2. An indicator circuit for indicating a phase displacement of signals of the same frequency including trigger circuits each of which comprises a first electron tube section and a second electron tube section, said second electron tube section passing normal current during conditions of no signal and generating a bias for said first tube to bias said first tube to non-conducting condition, said first tube being responsive to a signal to cause said circuit to have an increase in current in the first tube to maximum as a result of a signal and bias said second tube to non-conducting condition by a negative pulse generated by the first tube and said tubes being returned to normal after a period determined by the circuit constants, the one of said trigger circuits receiving the leading signal providing a large bias for substantially the duration of the signal and means for supplying said bias to the other circuit to block said circuit from responding to a signal until the first circuit returns to normal, and means connected in the output of at least one of said circuits to indicate when it is responding to a signal.

3. A phase comparing system including a pair of circuits each comprising an input tube biased to non-conducting condition; a second tube connected in parallel with the input tube and passing a plate current which normally biases the input tube to non-conducting condition; said input tube adapted to draw current upon receiving a positive signal and to produce a negative pulse, said negative pulse being applied to said second tube to reduce the current in the second tube and decrease the bias on the first tube, said action being progressive until current in said second tube is decreased to non-conducting condition and the first tube is drawing full current; and the second tube being adaptable after a suitable time delay to start passing current again which biases the first tube to non-conducting condition and restores the circuit to normal condition; and means intercoupling the circuits to cause the circuit receiving the signal first to bias the other circuit against an incoming signal until the circuit receiving the signal first has returned to normal.

4. An apparatus for detecting a phase difference between two alternating input signals of the same frequency, comprising first and second sharpening circuits each for reducing one of the input signals to a wave having a steep wave front, first and second detector circuits for detecting said steep front waves from said first and second sharpening circuits, respectively, each of which comprises a vacuum tube circuit for control by one of said waves and a biasing circuit including a second vacuum tube having a normal plate current therethrough, a cathode load resistor for said second tube arranged to develop a voltage drop thereacross determined by the plate current in said second tube, and means connecting said cathode load resistor to said first tube to cause the voltage drop in said resistance to bias the first tube to non-conducting condition during the absence of input to the first tube, said first tube being arranged to be responsive to a positive wave front to cause current to start flowing during the input signal, means connecting said first tube anode to the second tube grid to reduce the plate current in said second tube, said action being cumulative until the plate current in the first tube is maximum and that in the second tube is minimum, and means connecting said circuits together to cause the circuit receiving a signal first to bias the second circuit to prevent its being affected by a signal until after the first circuit has operated.

5. A circuit for detecting phase difference between two signals comprising a pair of circuits each responsive to said signals and each circuit including a vacuum tube circuit having first and second triode sections each comprising a cathode, anode and a grid, a plate voltage supply for said triodes, resistors serially connecting each of said anodes to said voltage supply, biasing means to cause plate current to flow in said second triode section comprising a series resistance connecting the grid to the cathode, and a second resistance connecting said cathode to ground, resistance means for the other triode grid connecting it to ground, said cathode of the last mentioned triode section being connected to said second resistance and receiving a positive bias therefrom which is a function of the plate current flow in the second triode section, said first triode section being biased by said second triode section against plate current flow, coupling means comprising a condenser connecting the first triode anode to the second triode grid through part of said grid cathode series resistance and operable upon reception of a positive pulse on the first triode grid to change the bias on the second triode grid and to cause the circuit to change to maximum current flow in the first triode section and minimum current flow in the second triode section, and means connecting the anode of the first triode section of each circuit to the grid of the first triode section of the other circuit including a series condenser and a diode for passing negative pulses to the first triode of the second circuit for biasing said circuit against incoming signals while a negative pulse is being generated in the first circuit, and means connected to said grid circuits of said triodes to ground to pass positive pulses received from the other circuit to ground and resistor means having a time constant for allowing the desired positive pulses to act on said first triode grids.

6. A circuit for detecting and indicating a difference in phase relation between alternating current pulses comprising a pair of pulse generating circuits each of which includes a vacuum tube circuit having first and second triode sections including a cathode, anode and a grid; a power supply and resistors for serially connecting each of said anodes to said power supply, biasing means to cause plate current to flow in said second triode section comprising a series resistance connecting the grid to the cathode and a second resistance connecting said cathode to ground, resistance means for the other triode grid connecting it to ground, said cathode of the last mentioned triode section being connected to said cathode grounding resistance of the second triode and receiving a positive bias therefrom which is a function of the current flow therein, said first triode section being biased by said second triode section against plate current flow, coupling means comprising a condenser connecting the first triode anode to the second triode grid through part of said grid cathode series resistance and operable upon reception of a positive pulse on the first triode grid to transmit a negative pulse to the second triode grid to change the grid bias and cause the circuits to change to maximum current flow in the first triode section and minimum current flow in the second triode section, means connecting the anode of the first triode section of the first pulse generating circuit to the grid of the first triode section of the other pulse generating circuit including a series condenser and diode for conducting said negative pulse to the first triode of the second circuit for biasing said circuit against generating a pulse while a negative pulse is being generated in the first circuit, and means connected to said grid circuit of said triode to ground to by-pass positive pulses received from the other circuit to ground and resistor means having a time constant for allowing the succeeding positive pulses to act on said first triode grids.

7. A circuit for detecting phase difference between two signals comprising a pair of circuits each circuit responsive to corresponding signals fed thereto and indicator means responsive thereto, each circuit including a vacuum tube circuit having first and second triode sections each comprising a cathode, anode and a grid; a plate voltage supply for said triodes, resistors serially connecting each of said anodes to said voltage supply, biasing means to cause plate current to flow in said second triode section comprising a series resistance connecting the grid to the cathode and a second resistance connecting said cathode to ground, resistance means for the other triode grid connecting it to ground, said cathode of the last mentioned triode section being connected to said second resistance and receiving a positive bias therefrom which is a function of the plate current flow in the second triode section, said first triode section being biased by said second triode section against plate current flow, coupling means comprising a condenser connecting the first triode anode to the second triode grid through part of said grid cathode series resistance and operable upon reception of a positive signal on the first triode grid to change the bias on the second triode grid and to cause the circuit to change to maximum current flow in the first triode section and minimum current flow in the second triode section.

8. The method of indicating phase difference between alternating currents of the same frequency by a circuit having a pair of pulse forming circuits and indicator means, which comprises triggering one of said pulse forming circuits with one of said alternating currents and the other of said pulse forming circuits with the other alternating current and operating the indicator means with the output of said pulse forming circuits to indicate whether or not the currents are in phase.

9. The method of indicating phase shift between alternating current signals of the same frequency by circuit means including pulse forming circuit means and an indicator which comprises shaping said signals to cause them to have sharp wave fronts, amplifying said signals, triggering said pulse forming circuit means with said amplified signals to control said pulse-forming circuit means, and applying the output signals with opposing effect to said indicator to render said indicator unresponsive to simultaneously received signals.

10. The method of indicating phase shift between alternating current signals of the same frequency in a circuit having pulse forming circuits and indicating means, which comprises shaping said signals to cause them to have steep wave fronts, amplifying said signals and triggering one of said pulse forming circuits with whichever of said signals is leading the other in phase, and causing the pulse circuit receiving the leading pulse to block the other of said pulse forming circuits during the reception of said leading pulse, and determining by said indicating means which of said pulse forming circuits is forming pulses.

11. The method of indicating phase shift between alternating current signals of the same frequency response which comprises causing each alternation of one of said signals which leads in phase to initiate a single oscillation in one of two oscillatory circuits and causing a voltage due to said single oscillation to prevent the response of the other of said two oscillatory circuits during the period of oscillation in the first of said two oscillatory circuits and determining which of said two circuits is responding to one of said alternating current signals by detection of the oscillation in one of said oscillatory circuits.

12. A circuit for detecting a phase difference between alternating current waves of the same frequency including two discrete circuits each having a limiter circuit and an amplifier circuit connected thereto for amplifying the signals, an output indicator operating circuit coupled to said amplifier circuit and including a pair of pulse generating circuits and trigger circuits for starting said pulse generating circuits and means intercoupling said trigger circuits to block one of said circuits from operating when the other circuit is operating.

13. An apparatus for indicating a phase difference between alternating electrical waves of the same frequency including two discrete wave shaping circuits, an output indicator operating circuit, said output indicator operating circuit including two trigger circuits each coupled to one of said wave shaping circuits and also intercoupled with each other in such a manner that the trigger circuit receiving the shaped electrical wave which leads the other shaped electrical wave in phase produces triggered pulses which operate an indicator and which also blocks the other of said trigger circuits from operating.

CECIL FARROW.

REFERENCES CITED

The following references are of record in the file of this patent:

UNITED STATES PATENTS

| Number | Name | Date |
|---|---|---|
| 2,050,059 | Koch | Aug. 4, 1936 |
| 2,113,214 | Luck | Apr. 5, 1938 |
| 2,153,158 | Rosenstein | Apr. 4, 1939 |
| 2,265,996 | Blumstein | Dec. 16, 1941 |
| 2,223,840 | Wolff | Dec. 3, 1940 |
| 2,282,951 | Engelhardt | May 12, 1942 |
| 2,287,174 | Heising | June 23, 1942 |
| 2,316,434 | Irwin | Apr. 13, 1943 |
| 2,320,476 | Schrader et al. | June 1, 1943 |
| 1,762,725 | Marrison | June 10, 1930 |
| 1,984,545 | Peterson | Dec. 18, 1934 |
| 1,684,403 | Mason | Sept. 18, 1928 |
| 1,846,314 | Crossley | Feb. 23, 1932 |
| 1,968,068 | Blancard et al. | July 31, 1934 |
| 2,044,749 | Usselman | June 16, 1936 |
| 2,370,692 | Shepherd | Mar. 6, 1945 |